(12) United States Patent
Sparrowhawk

(10) Patent No.: US 6,196,162 B1
(45) Date of Patent: Mar. 6, 2001

(54) VALVE AND WATER HEATER

(75) Inventor: Ian E. Sparrowhawk, High Wycombe (GB)

(73) Assignee: Beta Valve Systems Ltd. (GB)

( * ) Notice: Subject to any disclaimer, the term of this patent is extended or adjusted under 35 U.S.C. 154(b) by 0 days.

(21) Appl. No.: 09/436,523

(22) Filed: Nov. 9, 1999

(30) Foreign Application Priority Data

Nov. 9, 1998 (GB) ................................................ 9824565

(51) Int. Cl.[7] ........................................................ F22B 5/04
(52) U.S. Cl. ................. 122/13.3; 122/14.31; 222/146.2; 392/442
(58) Field of Search .................................. 122/13.3, 14.3, 122/14.31; 222/146.2, 146.5; 392/441, 442

(56) References Cited

U.S. PATENT DOCUMENTS

| | | | |
|---|---|---|---|
| 3,905,518 | * | 9/1975 | Dreibelbis et al. ............... 222/146.2 |
| 4,513,887 | * | 4/1985 | Wicke et al. ..................... 222/146.5 |
| 4,871,089 | * | 10/1989 | Rader et al. ...................... 222/146.5 |
| 5,690,061 | * | 11/1997 | Lopez ..................................... 122/17 |

* cited by examiner

*Primary Examiner*—Gregory Wilson
(74) *Attorney, Agent, or Firm*—Patterson, Thuente, Skaar & Christensen, P.A.

(57) ABSTRACT

A water heater and dispenser includes a heater reservoir and an expanded liquid reservoir. An outlet line includes a venturi valve with a port from the expanded liquid reservoir. Heated water in the expanded liquid reservoir is hence made use of.

10 Claims, 4 Drawing Sheets

VALVE AND WATER HEATER

CROSS-REFERENCE TO RELATED APPLICATION

The subject matter of this application is related to the subject matter of British patent application no. GB 9824565.7, filed Nov. 9, 1998, priority to which is claimed under 35 U.S.C. § 119 and which is incorporated herein by reference.

The invention relates to a valve and a water heater incorporating a valve.

A known water heater for use in a vending application, in particular an in-cup vending table top machine, is shown in FIG. 1. The heater includes a boiler 10 heated in a conventional manner such as by a thermostat controlled element (not shown), which dispenses heated water to a cup station 12 via a line 14. The line 14 carries a valve, such as a solenoid valve 16 of known type. The user operates a switch which opens the valve 16 for a predetermined period of time, allowing a cupful of heated water to be dispensed.

Cold water is fed to the boiler 10 from a header tank 20 via a line 22. The cold water is preferably fed to the bottom of the boiler 10, where the element is located, and hot water is dispensed from the top to line 14, based on convection as is well known. Pressure is maintained in the boiler 10 by the head of water in the header tank 20, although this can be enhanced by incorporating a cold water pump 24 in the line 22.

The header tank is fed from the water mains 30 via a line 32. One or more level sensors 34, for example at a minimum water level, desired water level and top water level feed signals to a processor 36 which controls a solenoid valve 38 on the line 32 to retain the water level in the header tank 20 at the desired level, and prevent overfilling or emptying of the header tank 20.

Typically the boiler (which term is used to designate a heater raising the water temperature to approaching 100° C.), heats the water from around 20° C. to around 85° C. As a result the expansion of the water is a significant factor, and in fact the volume of water expands by approximately 20% with this temperature differential. The known system overcomes this by feeding the expanded water to the header tank via an additional line 40. This system has various problems and drawbacks. Firstly the heated expanded water is used inefficiently, as it is simply returned to the header tank. Secondly, the water can be recirculated numerous times, which can give rise to hygiene problems. A problem with the system as a whole is that the header tank is bulky and renders the system complex and unwieldy.

A known proposed improved system is shown in FIG. 2. A boiler 50 includes an inlet 52 having a valve (not shown). The boiler communicates at its top with an outlet line 54 via a venturi outlet 56. The venturi outlet, as is well known, includes a throat of restricted diameter giving rise to a jet flow under pressure. Adjacent the venturi outlet 56 in the outlet line 54 is a further port 58 communicating with a container 60 for receiving expanded heated water. As the water expands it passes slowly through the inlet 54 and the port 58 into the container 56. When water is dispensed from the boiler 50 under pressure, the pressure reduces as it passes through the venturi outlet 54 and draws expanded water from the container 60 through the port 58. As a result the expanded water, which retains heat, is made use of. A problem with the arrangement, however, is that the positioning of the outlet is constrained, and a higher outlet line is required to reduce the risk of a siphon effect, increasing the bulk of the arrangement once again.

The invention and preferred features thereof are set out in the appended claims.

An embodiment of the invention will now be described, by way of example, with reference to the drawings, of which:

Figure 1:
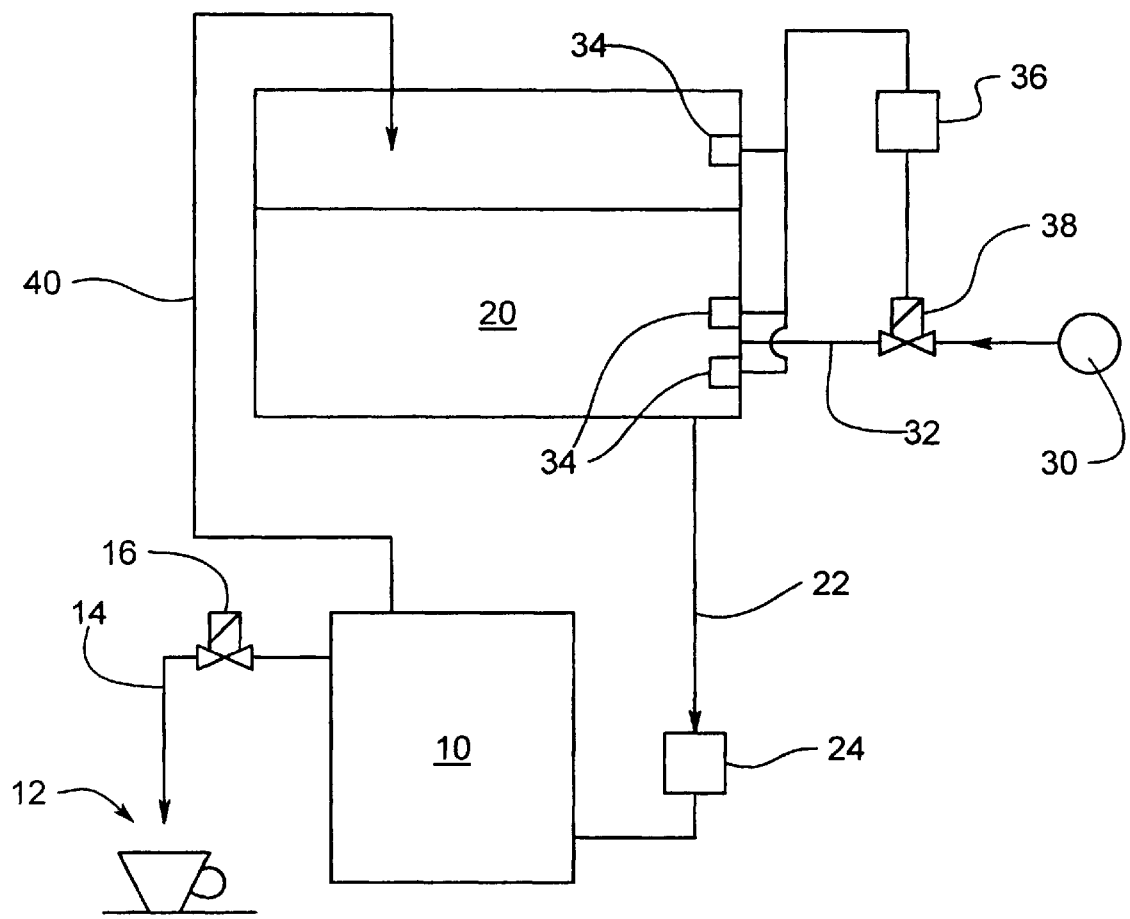
FIG. 1 shows schematically a known beverage dispenser.
Figure 2:
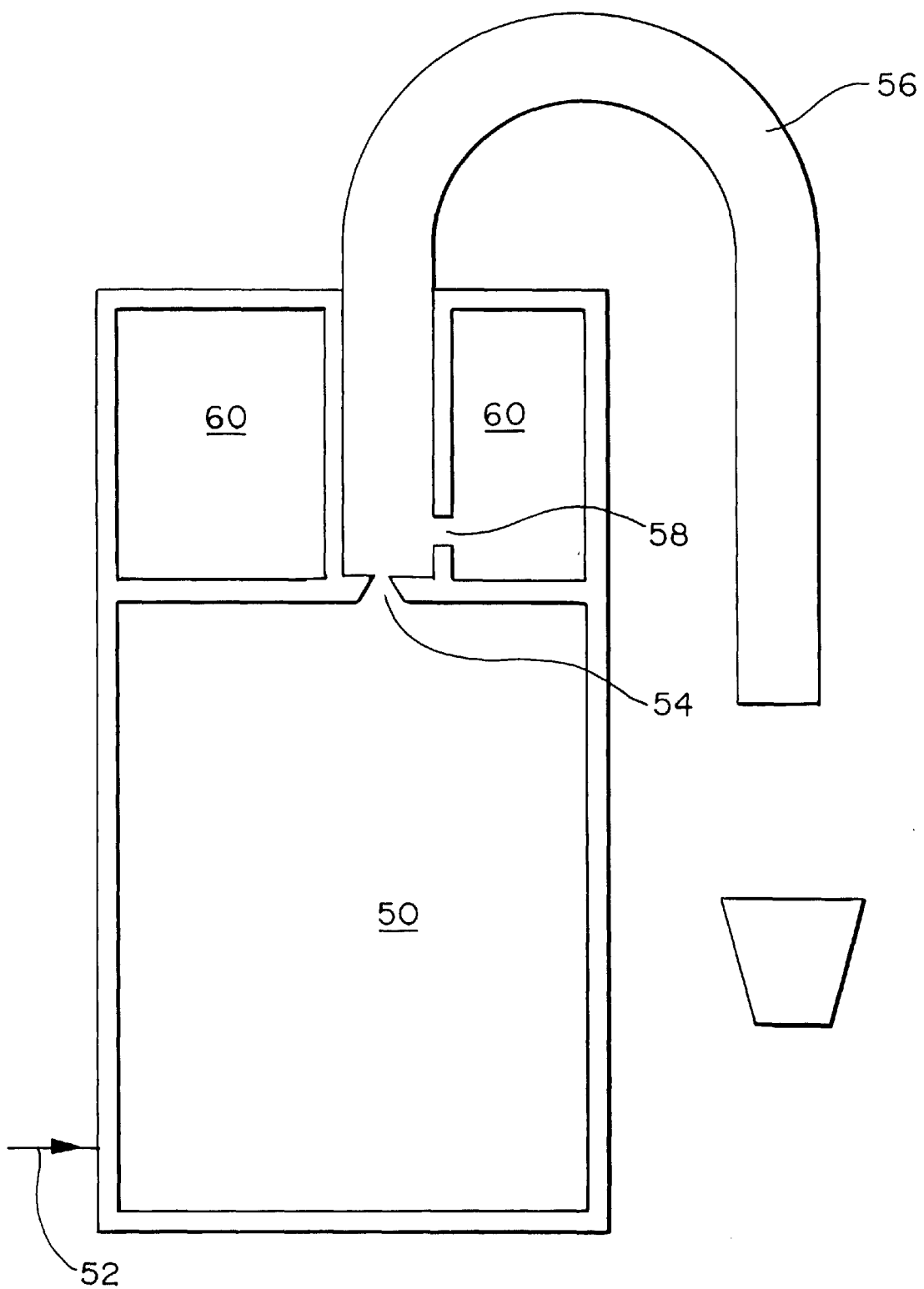
FIG. 2 shows schematically a further known beverage dispenser.
Figure 3:
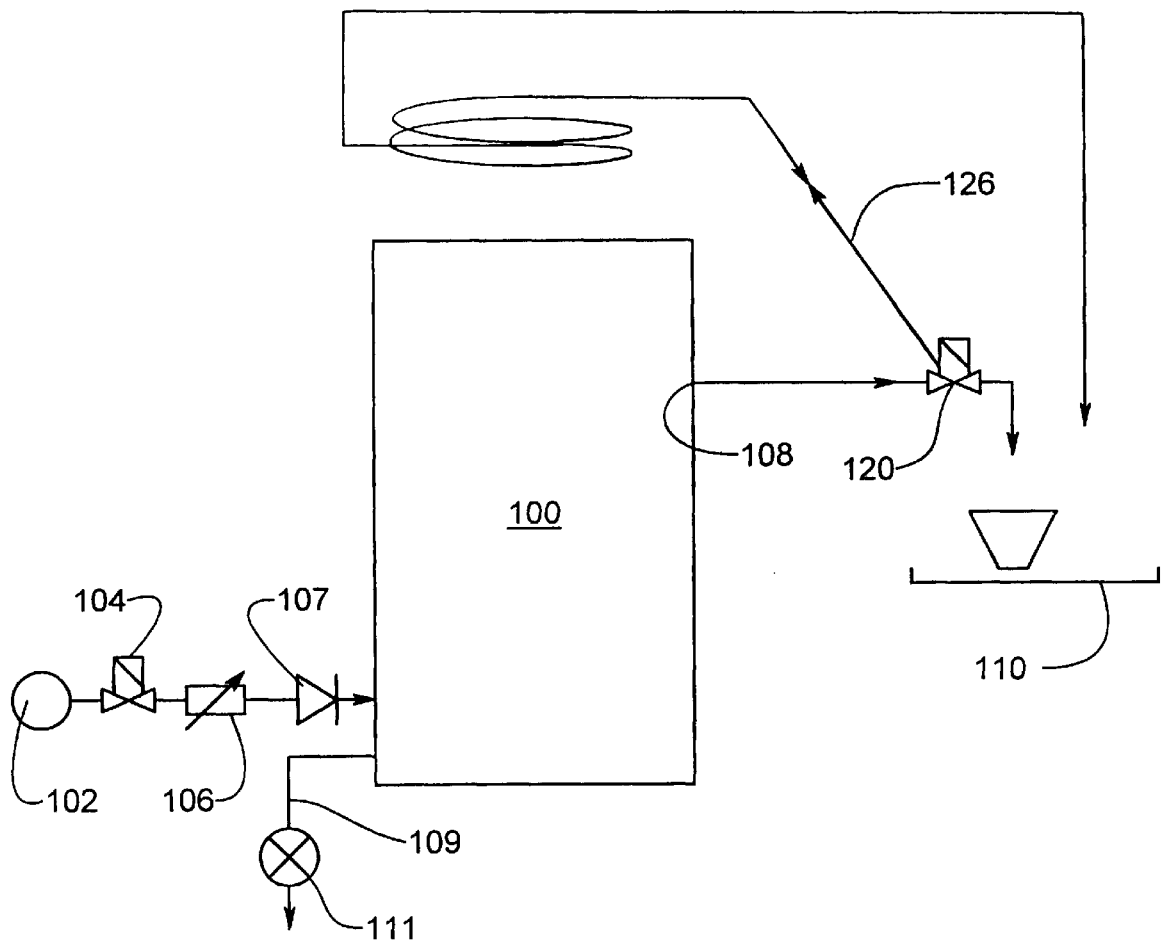
FIG. 3 shows schematically a system according to the present invention.

Referring to FIG. 3 the system of the present invention can be seen to comprise a boiler 100 heated in a suitable known manner such as by a thermostat controlled element (not shown), preferably to a temperature in the region of 80° C. Cold water is supplied from the mains 102, and the inlet runs to the bottom of the boiler in the conventional manner. Inlet water flow is controlled by a valve 104, preferably a solenoid valve of known type. In addition an automatic flow restrictor 106 is preferably provided regulating flow at approximately 2L/min, together with a one-way valve 107 to prevent backflow.

Figure 4:
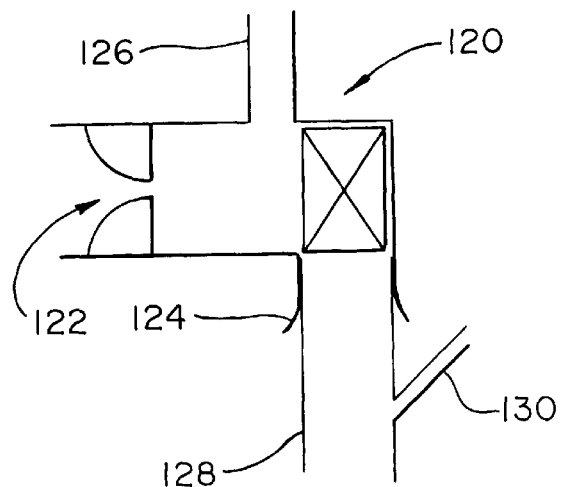
FIG. 4 shows schematically an outlet valve according to the present invention.
Figure 5A:
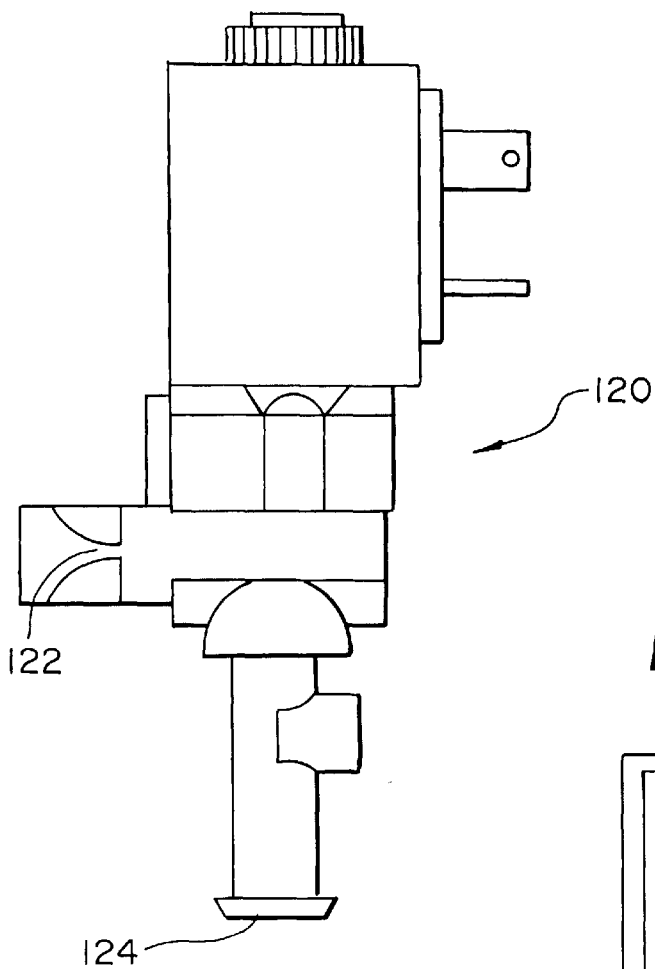
FIG. 5a is a detailed side view of the valve of FIG. 4.
Figure 5B:
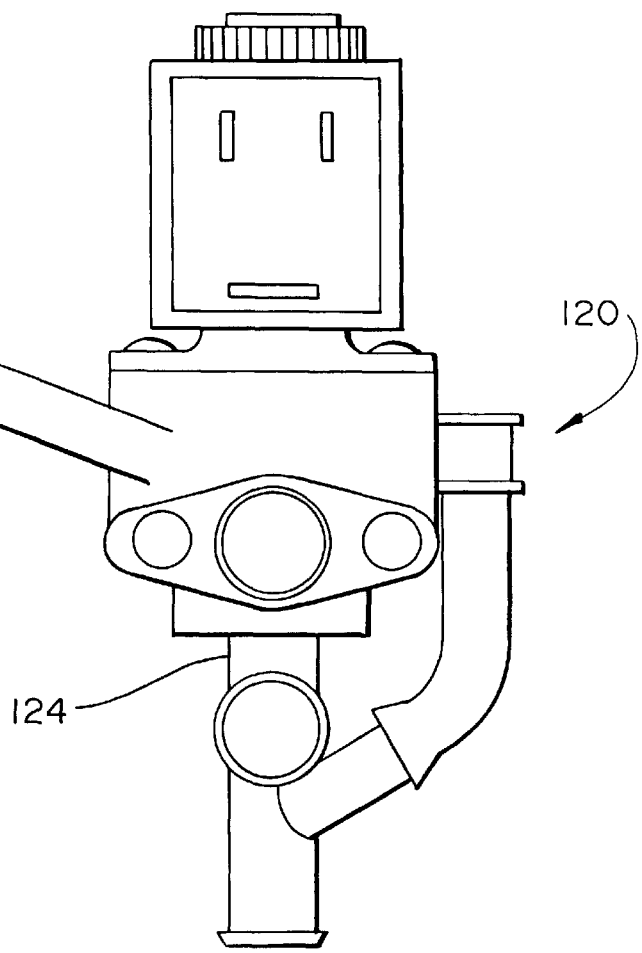
FIG. 5b is a detailed front view of the valve of FIG. 4.

Towards the top of the boiler 100 an outlet 108 is provided, as shown in more detail in FIG. 4, and FIGS. 5a and 5b. In particular the outlet comprises a three port valve body, comprising a venturi inlet port 122, an outlet port 124 and a port 126 to an expansion coil 128 (FIG. 3). The expansion coil preferably runs in the vicinity of a suitably warm part of the boiler 100 and includes an open end (preferably with a microbiological filter of appropriate known type) running to a drip tray in case of overflow. Downstream of the expansion coil port 128 a valve member, for example a solenoid operated valve member, is operable to open and close the passage to the outlet 124. An air vent 130 is provided on the outlet tube to provide dripless, clean flow.

The valve 120 is shown in more detail in FIGS. 5a and 5b. The main part of the valve is a conventional solenoid valve, such as the type sold under code E550, but modified to include a venturi inlet port (for example by including a conical insert in the inlet port) and a port 126 to the expansion coil.

Operation of the system is now described. With outlet valve 120 closed, the boiler 100 is filled from the mains via valve 104. The water is then heated and expanded water passes through outlet 108 and venturi inlet 122 into the expansion coil. When a user operates the machine to obtain a cupful of water, valves 104, 120 open simultaneously, such that the correct amount of water is ejected into the cup under mains pressure. Because of the venturi effect, expanded water is also drawn from the expansion coil via port 126. This has the combined effect of making use of the heated water in the expansion coil, and reducing the amount of water in the expansion coil, to reduce the risk excess expanded water exiting the coil into the drip tray 110. Bearing in mind that the inlet valve passes cold water, which will subsequently expand, it is metered to pass approximately 80% of a cupful, to retain the level in the expansion coil substantially constant.

Preferably a drain line 109 with valve 111 is provided at the base of the boiler. Because the expansion tube is open ended, it is possible to drain the system under gravity alone by opening the valve 111, simplifying maintenance.

As a result the invention allows a compact boiler system, making use of the heated expansion water, and retaining its heat by placing the coil adjacent an appropriate part of the boiler. Hot water is metered out accurately and substantially drip free, and there is little or no drainage of expansion water. The constant actuation and reversing flow of the venturi port of the outlet valve reduces limescale buildup, and the system is easily and quickly drained for servicing and maintenance. Because of the provision of an outlet solenoid valve, the outlet can be placed anywhere on the boiler. A minimum number of parts is required because of the dual action of the outlet valve as dispensing water outlet and expansion water channel. Additional pumps to provide sufficient agitation for mixing ingredients or the use of a header tank is not required; the system can operate on mains water pressure alone.

It will be appreciated that although the embodiment described comprises a beverage vending machine, any other suitable liquid control system can be implemented based on the principles discussed above, and in particular making use of the valve discussed above. In addition, although a solenoid valve is described, any other suitable valve with a venturi inlet can be used.

What is claimed is:

1. A liquid heater and dispenser comprising a heater reservoir for heating liquid, a liquid outlet line, and an expanded liquid reservoir, in which the heater reservoir communicates with the outlet line via an outlet valve comprising a three port valve body and a valve member, the valve body having a first venturi inlet port to the heater reservoir, a second outlet port to the outlet line, a communication path therebetween and a third port to the expanded liquid reservoir communicating with the communication path, the valve member being actuable to close the communication path intermediate the second port and third port.

2. A heater as claimed in claim 1 in which the venturi inlet also forms the inlet to the expanded liquid reservoir via the port.

3. A heater as claimed in claim 1 in which the venturi inlet, valve outlet and liquid reservoir port are provided on a common body.

4. A heater as claimed in claim 1 in which the outlet valve comprises a solenoid valve.

5. A heater as claimed in claim 1 in which the expanded liquid reservoir comprises an expansion coil.

6. A heater as claimed in claim 1 comprising a liquid inlet and inlet valve associated therewith, the inlet valve being arranged to allow in a first volume of liquid in a single operation, the outlet valve being arranged to allow out a second volume of liquid in a single operation, in which the ratio of the first volume to the second volume is substantially equal to the liquid expansion ratio in the heater reservoir.

7. A heater as claimed claim 4 in which the expanded liquid reservoir includes an overflow line.

8. A heater as claimed in claim 7 in which the heater reservoir includes a drainage valve in the vicinity of its base.

9. A heater as claimed in claim 1 comprising a beverage dispensing machine.

10. A method of operating a liquid heater having an unheated liquid inlet valve and a heated liquid outlet valve, in which the inlet valve allows inlet of a first volume of water, the outlet valve allows outlet of a second volume of water, and the ratio of the first and second volumes is substantially equal to the ratio of expansion of liquid in the liquid heater, wherein the outlet valve has a three port valve body and a valve member, the valve body having a first venturi inlet port to the heater reservoir, a second outlet port to the outlet line, a communication path therebetween and a third port to the expanded liquid reservoir communicating with the communication path, the valve member being actuable to close the communication path intermediate the second port and third port.

* * * * *